Figure 1:
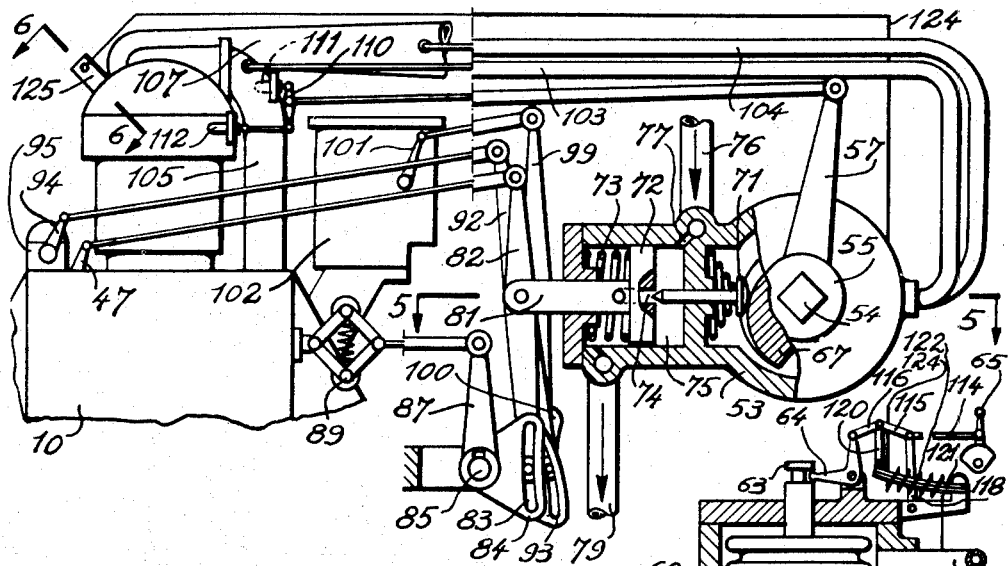

Jan. 13, 1959     F. C. REGGIO     2,868,183
ENGINE FUEL-AIR RATIO CONTROL
Original Filed Nov. 20, 1944

Inventor
F. C. Reggio

United States Patent Office 2,868,183
Patented Jan. 13, 1959

2,868,183

ENGINE FUEL-AIR RATIO CONTROL

Ferdinando Carlo Reggio, Tampa, Fla.

Application February 9, 1954, Serial No. 409,063, which is a division of application Serial No. 564,379, November 20, 1944, now Patent No. 2,670,724, dated March 2, 1954. Divided and this application May 6, 1957, Serial No. 657,401

27 Claims. (Cl. 123—119)

This invention relates to engine fuel regulating systems, and more particularly to mechanisms for automatically controlling the engine fuel-air ratio as a predetermined function of various engine operating conditions. The invention is particularly useful in connection with aircraft engines and other powerplants operating under varying conditions of altitude, temperature, power and speed.

The present application is a division of my application Serial No. 409,063 filed February 9, 1954, which is in turn a division of my application Serial No. 564,379 filed November 20, 1944, now Patent No. 2,670,724 issued March 2, 1954.

Aircraft engines designed to operate under wide variations of altitude, temperature, speed and load conditions, are very sensitive to the combustible mixture which is supplied thereto.

In order to obtain satisfactory performance, it is necessary constantly to maintain the fuel-air ratio at its optimum value. This optimum fuel-air ratio, of course, is not constant, but varies as the engine operating conditions change. Altitude, temperature, speed and load affect this mixture. Thus it is a primary object of this invention to provide a fuel-air ratio control device which changes the fuel-air proportions automatically, rapidly and accurately as a function of certain selected parameters without requiring any attention on the part of the pilot.

Another object is to provide an automatic fuel-air ratio control which supplies to the engine the proper fuel-air mixture at all speeds, temperatures and altitudes.

A further object is to provide a control system which senses the pilot's requirements and makes rapid and accurate adjustments in the engine fuel-air ratio for variations in altitude, pressure and temperature.

A still further object is to provide an advanced fuel-air ratio control device including a three dimensional cam which is so contoured that it can adapt itself to all combinations of induction air temperature and pressure. The control device may be readily adapted to engines having different operating characteristics by changing the configuration of the three dimensional cam.

Other objects and advantages will be more particularly pointed out hereinafter or will become apparent as the description proceeds.

In the accompanying drawings there is illustrated an example of embodiment for the purpose of disclosing the invention. The drawings, however, are for the purpose of illustration only and are not to be taken as limiting or restricting the invention since it will be apparent to those skilled in the art that various changes in the illustrated construction may be resorted to without departing from the scope of this novel concept.

Figure 2:
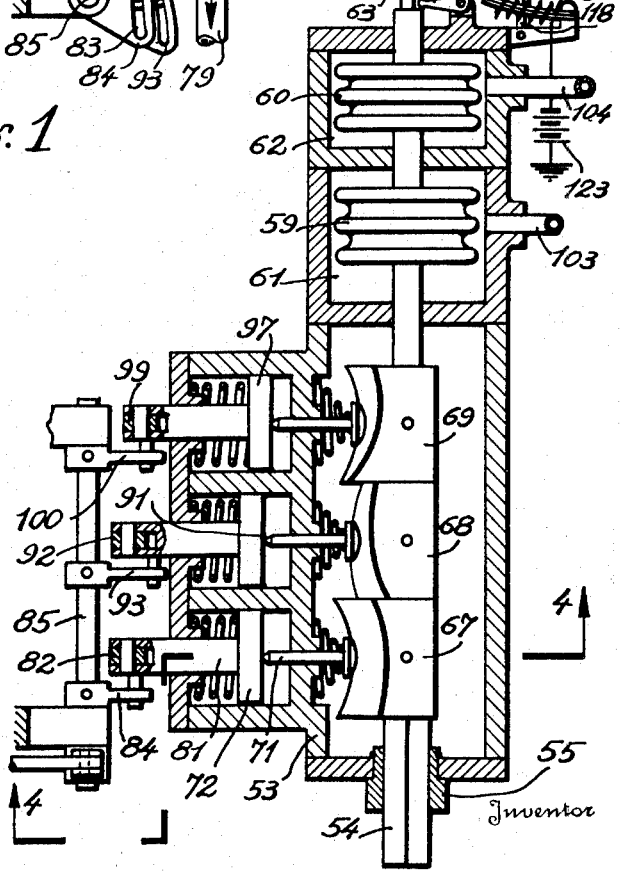

In the drawings, Figure 1 shows in side elevation an example of engine control system embodying the invention, and Figure 2 is a section taken along the line 5—5 of Figure 1.

Referring to the drawings in detail, the numeral 10 indicates an engine, shown in reduced scale as a conventional radial aircraft engine, and a preferred embodiment of control system therefor according to the invention. This includes a regulator having a housing 53 and a shaft 54 therein, formed with a non-circular or splined end slidable in a sleeve 55 which is rotatably mounted in the cover of housing 53 and is provided with a lever 57 which serves to control the angular adjustment of the shaft. This shaft 54 is connected with two expansible pressure responsive bellows 59 and 60 which are coaxial therewith and enclosed within sealed housings 61 and 62, respectively. The far end of the latter bellows is secured to a shaft element 63 which extends through a bore formed in the cover of the housing 62 and which is provided with an annular groove engaged by one end of a bellcrank lever 64 linked to a remote control member such as a pilot's lever 65. Three warped or three dimensional cams 67, 68 and 69 are secured to the shaft 54, and the whole shaft assembly including cams, bellows and element 63 are rotatable with lever 57, while the axial adjustment of the shaft 54 and of the three warped cams is dependent upon the setting of the pilot's lever 65 and the pressure within the bellows housings 61 and 62.

The slidable and rotatable warped cam 67 actuates a spring loaded needle valve 71 slidably mounted in the end wall of a hydraulic cylinder including a power piston 72 loaded by a spring 73, provided with a discharge conduit 74 coaxial with the valve 71, and actuated by the pressure oil in chamber 75. Oil is admitted to chamber 75 from a high pressure oil line 76 through a calibrated orifice 77, and is drained therefrom through the conduit 74 whose effective open area is dependent upon the relative axial adjustment of the needle valve 71 and power piston 72; and through the low pressure return on line 79. In steady state operation the force exerted by the compression spring 73 against the piston 72 is balanced by the pressure of the oil or hydraulic fluid in the cylinder chamber 75, which pressure has an intermediate value between the high pressure fluid in line 76 and the low pressure fluid in the drain line 79. If now the cam 67 is moved so as to shift the cam follower 71 to the left, the needle valve decreases the effective area of the discharge orifice 74 while the admission orifice 77 remains unchanged, the oil pressure in the chamber 75 rises, and the power piston 72 moves to the left. Conversely, if the cam 67 is moved in a direction to shift the needle valve 71 to the right, the discharge orifice 74 increases, the oil pressure in the cylinder chamber 75 drops, and the piston 72 moves to the right. In either case, the power piston 72 quickly and accurately follows any movement of the cam follower 71.

The power piston 72 is provided with a rod 81 connected with an intermediate point of a floating lever 82 whose lower end carries a pin engaging a slot 83 formed in a cam 84 secured to a shaft 85. The angular adjustment of this shaft is controlled by a lever 87 actuated by centrifugal flyballs 89 driven from the engine 10 and is therefore dependent upon the engine speed. The upper end of lever 82 is connected with a lever 47 mounted on the engine 10. This lever 47 is part of a mechanism which is embodied in the engine and serves to vary the compression ratio of the engine cylinders. Clockwise or counter-clockwise rotation of this lever 47 causes the cylinder compression ratio to increase or decrease, respectively. This compression ratio control device is no part of the present invention, and is not material to an understanding of the present invention, but is disclosed in detail in my copending application Serial No. 409,063 mentioned above.

A second power piston 91, similar to piston 72, is actuated from the warped cam 68 and is connected with an intermediate point of a second floating lever 92 whose lower point is controlled through a pin and slot connection by a cam 93 secured to the shaft 85. The upper end of lever 92 is connected with the ignition timing control lever 94 which angularly adjusts the electrical circuit breaker of the magneto 95 or other equivalent spark timing control device, and can be rotated clockwise to advance the spark or counter-clockwise to retard the spark.

A third power piston 97, actuated from cam 69, controls an intermediate point of lever 99 whose lower end is adjusted through a pin and slot connection by a cam 100 carried by the shaft 85. The upper end of lever 99 actuates a fuel-air mixture ratio control lever 101 which may be provided in connection with the engine fuel injection control system in case of an injection engine or, as shown in Figure 1, with the engine carburetor 102. Counter-clockwise rotation of lever 101 increases the fuel-air ratio.

The sealed bellows housings 61 and 62 are connected by means of conduits 103 and 104 with the engine induction manifold 105 and with the exhaust manifold 107, respectively. A conventional gear-driven supercharger may be provided in the engine 10, between the carburetor 102 and the manifold 105.

The lever 57 of the regulator is connected with a floating lever 110 whose upper and lower ends are actuated by a manifold or intake charge temperature responsive element 111, and by a cylinder temperature responsive element 112, respectively, whereby an increase of either temperature causes clockwise rotation of lever 57, as shown in Figure 1, and cams 67, 68 and 69.

A pilot's lever 65 is connected with the bell-crank lever 64 by a linkage which includes the rod elements 114, 115 and 116. The pivot between elements 114 and 115 is guided by a lever 118 rotatably mounted on the cover of housing 62; while the pivot between elements 115 and 116 is connected with one end of lever 120 whose opposite end is carried by the free extremity of a bimetallic strip 121 surrounded by a heating coil 122 and so designed as to deflect upward when heated. The coil is connected with a storage battery 123 and, through the conductor 124, with a contact included in the detonation detector 125 mounted on the head of one of the engine cylinders.

The detonation detector 125 is no part of the present invention, and the specific structure thereof is unnecessary for an understanding of the invention. A full description of the detonation detector 125 is found in said Patent 2,670,724. It need only be noted here that the detonation detector 125 includes an electric contact, one element of which is connected with the conductor 124, while the other element is connected to the ground through the engine cylinder, and that during normal engine operation the contact remains open, no current flows around the heating coil 122, the bimetallic strip 121 remains flat, and the linkage elements 115 and 116 are substantially coaxial. However, the arrangement is such that whenever detonation occurs, the contact elements are caused to engage and determine flow of current through the heating coil 122, whereupon the bi-metallic strip 121 bends upward and throws the linkage elements 115 and 116 out of line as shown in Figure 2. Thus, for a fixed adjustment of the manual level 65, the occurrence of detonation determines clockwise rotation of the bell-crank lever 120 and axial displacement of the shaft 54.

It is therefore clear that owing to the axial and angular motions of the warped cams 67, 68 and 69 and to the rotation of cams 84, 93 and 100, the regulator 53 simultaneously regulates the cylinder compression ratio, the ignition timing and the fuel-air ratio as a predetermined function of the adjustment of the pilot's lever 65, the induction and exhaust pressures, the rate of cylinder pressure rise or intensity of detonation, the intake charge and cylinder temperatures, and the engine speed. The warped cams and the slots in the rotatable cams may be so designed as to obtain for each set of operating pressures, temperatures and speed predetermined optimum values of compression ratio, ignition timing and combustible mixture ratio. For example, where the operating pressures, temperatures and speed are those corresponding to normal cruising conditions, the regulator will maintain high compression ratio, large spark advance and lean mixture to insure optimum fuel economy. Upon increase of intake charge temperature and/or cylinder temperature, the ensuing rotation of the cams may decrease the compression ratio and/or retard the spark and increase the fuel-air ratio. If the engine power output is increased, the increase of engine speed, manifold pressure and operating temperatures cause rotation of the cams 84, 93 and 100 and axial and angular displacement of the warped cams 67, 68 and 69 to decrease the compression ratio, retard the spark and increase the fuel-air ratio. The lever 65 may be used to adjust the operative setting of the regulator in accordance with the octane rating or antidetonating characteristics of the fuel employed, and is supplemented by the detonation detector 125. Should detonation occur, the bending of the strip 121 would cause sliding motion of the cams in the same direction as if caused by increase of manifold pressure. Obviously, the regulator may be designed for the automatic adjustment of compression ratio, spark advance and fuel-air ratio throughout the whole range of engine operating conditions, including starting and idling.

This embodiment of the invention has been shown merely for purpose of illustration and not as a limitation of the scope of the invention. It is therefore to be expressly understood that the invention is not limited to the specific embodiment shown, but may be used in various other ways, and that various changes, substitutions, additions and omissions may be made in the construction, arrangement and manner of operation of the parts and elements within the scope or limits of the invention as defined in the following claims. Moreover, the invention may be used in connection with different types of engines, powerplants or prime movers. In particular, while the warped or three dimensional cams have been disclosed as slidable and rotatable, according to the invention they may have different orders of adjustment, for example they may be reversibly slidable in two different directions.

Where the claims are directed to less than all of the elements of the complete system disclosed, they are intended to cover possible uses of the recited elements in installations which lack the non-recited elements.

Certain features claimed herein are disclosed in my applications Serial No. 401,353 filed July 7, 1941, now Patent No. 2,378,036 and Serial No. 523,192 filed February 21, 1944, now Patent No. 2,378,037.

I claim:

1. For use with an engine having an air induction system and a fuel supply system, the combination with a three-dimensional cam having two distinct orders of reversible motion, of manually operable means for imparting reversible motion of the first order to said cam, air induction temperature responsive means for imparting reversible motion of the second order to said cam, a cam follower positioned by said cam, a servomotor, servomotor control means positioned by the cam follower, fuel-air ratio regulating means associated with said fuel supply system and movable to vary the engine fuel-air ratio, engine speed responsive means, and an operative connection including said speed responsive means for actuating said fuel-air ratio regulating means from the servomotor.

2. For use with an engine having an air intake system and a fuel supply system, the combination with first control means for varying the engine fuel-air ratio, of a servomotor for actuating said control means, valve means for controlling said servomotor, a cam follower for positioning said valve means, a three-dimensional cam having two distinct ways of reversible motion for actuating the cam follower, temperature responsive means sensing temperature variations in the engine air intake system for positioning the cam in one way, manually operable control means operatively connected to the cam for positioning the same in the other way, engine speed responsive means, and an operative connection including said engine speed responsive means between said servomotor and said first control means for actuating the latter to control the engine fuel-air ratio in accordance with the position of the servomotor and the engine speed.

3. For use with an aircraft engine having an air intake system and a fuel supply system, the combination with a fuel-air ratio regulating device associated with said fuel supply system and movable to increase or decrease said ratio, of a three-dimensional control cam adapted for two distinct ways of reversible motion, namely rotary motion and sliding motion, a pilot's lever, an operative connection for varying the position of said cam in one way from said pilot's lever, an air intake temperature sensor, a connection for varying the position of the cam in the other way from said temperature sensor, a cam follower positioned by said cam, a hydraulic servomotor having a power piston, a valve connected to the cam follower for controlling said power piston, a centrifugal speed-responsive device driven from the engine, and an operative connection including said speed responsive device between the servomotor power piston and the fuel-air ratio regulating device for moving the latter with changes in the setting of the power piston and variations of engine speed.

4. For use with an engine having an air induction system and a fuel supply system, the combination with a control member associated with said fuel supply system and operable to vary the engine fuel-air ratio, of a three-dimensional cam adapted for two distinct ways of reversible motion, namely rotary motion and sliding motion, manually operable means operatively connected with said cam for positioning the same in one way, air induction temperature responsive means for positioning the cam in the other way, a servomotor, servomotor control means positioned by said cam, an engine speed responsive device, and an operative connection including said speed responsive device for positioning said control member from the servomotor to alter the engine fuel-air ratio in response to movement of said manually operable means or variations of engine speed.

5. In an engine liquid fuel supply system, the combination with fuel-air ratio control means movable to vary the engine fuel-air mixture, of a three-dimensional cam, a cam follower, first positioning means for causing relative motion of a first order between said cam and said cam follower, temperature responsive means for sensing variations in the temperature of the air supplied to the engine for actuating said first positioning means, second positioning means for causing relative motion of a second order between said cam and said cam follower, manually operable means for actuating said second positioning means, engine speed responsive means, and an operative connection including said speed responsive means for actuating said fuel-air ratio control means from the cam follower to provide proper fuel-air mixture at all speeds and temperatures and change the fuel-air proportions rapidly and automatically with variations in said speed, temperature and upon changes in the setting of said manually operable means.

6. In a liquid fuel supply system for an engine having an air intake system, the combination with fuel-air ratio control means, of a three-dimensional cam, a cam follower, first positioning means for causing relative motion of a first order between said cam and said cam follower, temperature responsive means for sensing variations in the temperature in said air intake system to actuate said first positioning means, second positioning means for causing relative motion of a second order between said cam and the cam follower, pressure responsive means for sensing pressure variations in said air intake system to actuate said second positioning means, and means for actuating said fuel-air ratio control means from said cam follower including engine speed responsive means operating to vary the effect of the cam follower upon the fuel-air control means, thereby providing proper fuel-air mixture at all speeds, temperatures and altitudes, and changing the fuel-air proportions rapidly and automatically with variations in said speed, temperature and altitude.

7. In control apparatus for an air-consuming aircraft engine, the combination with first control means movable in one direction to increase the engine fuel-air ratio and in the opposite direction to decrease the engine fuel-air ratio, of engine speed responsive means for actuating said first control means, a servomotor connected with the speed responsive means for varying the effect thereof on said first control means, servomotor control means, a three-dimensional cam adjustable in two different ways, a cam follower for actuating the servomotor control means, means responsive to the temperature of the air taken in by the engine for adjusting the cam in one way, and means subject to manual supervision for adjusting the cam in the other way.

8. In control apparatus for an air-consuming aircraft engine, the combination with first control means movable in one direction to increase the engine fuel-air ratio and in the opposite direction to decrease the engine fuel-air ratio, of engine speed responsive means for actuating said first control means, a hydraulic servomotor having a power piston operatively connected with said speed responsive means for varying the action thereof upon said first control means, a servomotor control valve, a slidable and rotatable three-dimensional cam, a cam follower for actuating the servomotor control valve, first adjusting means for axially positioning said cam, second adjusting means for angularly positioning said cam, means responsive to the temperature of the air taken in by the engine for actuating one of said adjusting means, and means subject to manual supervision for actuating the other adjusting means.

9. In a fuel control system for air-consuming aircraft engines and the like, the combination with first control means movable in one direction to increase the fuel-air ratio and in the opposite direction to decrease the fuel-air ratio, of adjustable engine speed responsive means operatively connected with said first control means for actuating the same, a three-dimensional cam for varying the operating adjustment of said speed responsive means to modify the action thereof on said first control means, temperature responsive means for reversibly adjusting said cam in one way, and means responsive to a pressure varying with the altitude for reversibly adjusting said cam in another way, whereby preselected fuel-air proportions may be automatically provided for all combinations of speed, temperature and altitude.

10. In a fuel control system for an aircraft engine having an air intake system, the combination with first control means movable in one direction to increase the fuel-air ratio and in the opposite direction to decrease the fuel-air ratio, of adjustable engine speed responsive means for actuating said first control means, a three-dimensional cam adjustable in two ways for modifying the operating adjustment of said speed responsive means, temperature responsive means for adjusting said cam in one way, means responsive to pressure in said air intake system for adjusting said cam in another way, and additional means manually operable and operatively connected with said cam for altering the adjustment thereof.

11. In a fuel control system for air-consuming aircraft engines and the like, the combination with first control means movable in one direction to increase the engine fuel air ratio and in the opposite direction to decrease the fuel-air ratio, of an engine-driven speed responsive device operatively connected with said first control means to actuate the same in response to variations in engine speed, a servo-mechanism having power means operatively connected with said speed responsive means for altering the action thereof on said first control means, servo-mechanism control means, a slidable and rotatable three-dimensional cam, a cam follower for positioning the servo-mechanism control means from the cam, a first sensor device responsive to variations in a first condition affecting engine operation for axially adjusting said cam relative to the cam follower, and a second sensor device responsive to changes in a second condition affecting engine operation for angularly adjusting the cam relative to the cam follower.

12. In a fuel control system for air-consuming aircraft engines and the like, the combination with first control means movable in one direction to increase the engine fuel-air ratio and in the opposite direction to decrease the fuel-air ratio, of an engine-driven speed responsive device operatively connected with said first control means to actuate the same in response to variations in engine speed, a servo-mechanism having power means operatively connected with said speed responsive means for altering the action thereof on said first control means, servo-mechanism control means, a three-dimensional cam, adjustable in two different ways, a cam follower for positioning the servo-mechanism control means from the cam, a sensor device responsive to variations in a condition affecting engine operation for adjusting said cam relative to the cam follower in one way, and manually operable means for adjusting the cam relative to the cam follower in the other way.

13. In a fuel control system for air consuming aircraft engines and the like, the combination with regulating means whose motion in one direction increases the fuel-air ratio and in the opposite direction decreases the fuel-air ratio, of speed responsive means driven from the engine for positioning said regulating means in accordance to engine speed, a fluid pressure servo-motor having a power piston operatively connected with the speed responsive means and movable to vary the action thereof upon said regulating means, resilient means in said system exerting on said power piston a force tending to move the same in one direction, a variable pressure cylinder chamber on one side of said power piston for exerting thereon a force tending to move said piston in the opposite direction, fixed orifice means for admitting pressure fluid to said cylinder chamber, variable orifice means for regulating the flow of fluid out of said cylinder chamber to control the pressure therein, said variable orifice means including an orifice element movable with the power piston and a valve element movable with respect to the orifice element for varying the effective open area thereof, the arrangement being such that movement of the valve element in either direction causes such pressure variations in the cylinder as to determine a like movement of the power piston in the same direction, a cam follower connected to actuate the valve element, a three-dimensional cam having two distinct ways of reversible motion relative to the cam follower for positioning the same, a first mechanism sensing variations in an engine operating condition for moving said cam in one way, and a second mechanism subject to manual supervision for moving said cam in the other way.

14. In a fuel control device for an engine having an air intake system, including regulating means movable in one direction to increase the fuel-air ratio and in the opposite direction to decrease the same ratio, the combination with adjustable engine speed responsive means for actuating said regulating means, of servo-motor means connected with said speed responsive means for modifying the adjustment thereof to alter the effect of the speed responsive means on the regulating means, servo-motor control means, a slidable and rotatable three-dimensional cam for positioning the servo-motor control means, first cam adjusting means for sliding said cam, second cam adjusting means for rotating said cam, a temperature sensor device adapted for connection with the engine air intake system for actuating one of said cam adjusting means, and additional means subject to manual supervision for actuating the other cam adjusting means.

15. In a fuel control system for an air-consuming engine, the combination with regulating means movable in one direction to increase the fuel-air ratio and in the opposite direction to decrease said ratio, of adjustable engine speed responsive means for actuating said regulating means, servo-motor means connected with said speed responsive means for altering the adjustment thereof to vary the effect of the speed responsive means on the regulating means, servo-motor control means, a slidable and rotatable three-dimensional cam for positioning the servo-motor control means, first cam adjusting means for sliding said cam, second cam adjusting means for rotating said cam, a temperature sensor device adapted for connection with the engine for actuating one of said cam adjusting means in response to engine operating temperature, and means subject to manual supervision for actuating the other cam adjusting means.

16. In a fuel control system for an air-consuming engine, the combination with regulating means movable in one direction to increase the fuel-air ratio and in the opposite direction to decrease said ratio, of adjustable engine speed responsive means for actuating said regulating means, servo-motor means connected with said speed responsive means for altering the adjustment thereof to vary the effect of the speed responsive means on the regulating means, servo-motor control means, a slidable and rotatable three-dimensional cam for positioning the servo-motor control means, first cam adjusting means for sliding said cam, second cam adjusting means for rotating said cam, a temperature sensor device adapted for connection with the engine for actuating one of said cam adjusting means in response to engine operating temperature, and a pressure sensor device adapted for connection with the engine for actuating the other cam adjusting means in response to an engine operating pressure.

17. In a fuel control system for an air-consuming engine, the combination with regulating means movable in one direction to increase the fuel-air ratio and in the opposite direction to decrease said ratio, of adjustable engine speed responsive means for actuating said regulating means, a compensating mechanism connected with said speed responsive means for adjusting the same to modify the effect thereof on said regulating means, said compensating mechanism including a three-dimensional cam reversibly adjustable in two different ways, temperature responsive means sensing operating temperatures in two different portions of the engine for positioning said cam in one way, and means responsive to operating pressure in a portion of the engine for positioning the cam in the other way.

18. In a fuel control system for an air-consuming engine, the combination with regulating means movable in one direction to increase the fuel-air ratio and in the opposite direction to decrease said ratio, of adjustable engine speed responsive means for actuating said regulating means, a compensating mechanism connected with said speed responsive means for adjusting the same to modify the effect thereof on said regulating means, said compensating mechanism including a three-dimensional cam reversibly adjustable in two different ways, means responsive to an engine operating temperature for positioning said cam in one way, and pressure responsive means sensing operating pressures in two different portions of the engine for positioning said cam in the other way.

19. In a fuel control device for an air-consuming engine, the combination with regulating means movable in one direction to increase the fuel-air ratio and in the opposite direction to decrease said ratio, of an actuating mechanism including a three-dimensional cam having two different ways of reversible adjustment for positioning said regulating means, temperature sensing means responsive to two distinct engine operating temperatures for adjusting the cam in one way, and pressure sensing means responsive to two different engine operating pressures for adjusting the cam in the other way.

20. In a fuel control device for an air-consuming engine, the combination with regulating means movable in one direction to increase the fuel-air ratio and in the opposite direction to decrease said ratio, of an actuating mechanism including a three-dimensional cam having two different ways of reversible adjustment for positioning said regulating means, temperature sensing means responsive to two distinct engine operating temperatures for adjusting the cam in one way, pressure sensing means responsive to two different engine operating pressures for adjusting the cam in the other way, and additional means subject to manual setting for varying the adjustment of said cam.

21. In a fuel control system for an air-consuming aircraft engine, the combination with regulating means movable in one direction to increase the fuel air ratio and in the opposite direction to decrease said ratio, of engine driven speed responsive means for positioning said regulating means as a function of engine speed, and a trimming device operatively connected with said speed responsive means for varying the effect thereof on said regulating means, said trimming device including a slidable and rotatable three-dimensional cam, a cam follower positioned by said cam connected with said speed responsive means for modifying the operative setting thereof, a first sensor device responsive to a parameter of engine operation for axially positioning said cam, and a second sensor device responsive to another parameter of engine operation for angularly positioning the cam.

22. In a fuel control system for an engine having an air intake system, the combination with regulating means movable in one direction to increase the fuel-air ratio and in the opposite direction to decrease said ratio, of adjustable engine-driven speed responsive means for positioning said regulating means in predetermined relation to engine speed, a slidable and rotatable three-dimensional cam, a cam-follower positioned by said cam and operatively connected with said speed responsive means for varying the operative setting thereof as a function of cam lift, first adjusting means for rotating said cam, second adjusting means for sliding said cam, a sensing device responsive to temperature in the engine air intake system for actuating one of said cam adjusting means, and a sensing device responsive to another parameter of engine operation for actuating the other adjusting means.

23. In a fuel control system for an engine having an air intake, the combination with regulating means movable in opposite directions to increase or decrease the fuel-air ratio, of adjustable engine driven speed responsive means for actuating said regulating means, a three-dimensional cam, a cam follower operatively connected with said speed responsive means for modifying the operating adjustment thereof to vary the effect of said speed responsive means upon said regulating means, said cam being arranged for axial and rotary motion relative to the cam follower, means responsive to a first parameter of engine operation for axially adjusting the cam in relation to the cam follower, and means responsive to a second parameter of engine operation for angularly adjusting the cam in relation to the cam follower.

24. In a fuel control system for an air-consuming engine, the combination with regulating means whose motion in opposite directions operates to increase or decrease the fuel-air ratio, of engine-driven speed responsive means for actuating said regulating means, said speed responsive means including a floating lever which is adjustable to modify the effect of the speed responsive means on the regulating means, a slidable and rotatable three-dimensional cam, a cam follower operatively connected with the floating lever for altering the adjustment thereof, and a plurality of sensor devices each responsive to a parameter of engine operation for axially and angularly adjusting said cam.

25. In a fuel control system for an engine having an air inlet system, the combination with regulating means whose motion in opposite directions operates to increase or decrease the fuel-air ratio, of adjustable engine-driven speed responsive means for actuating said regulating means, a slidable and rotatable three-dimensional cam, a cam follower positioned by said cam and operatively connected with said speed responsive means for varying the operative setting thereof, first adjusting means for angularly positioning said cam, second adjusting means for axially positioning said cam, a sensor device responsive to temperature in the engine air inlet system for actuating one of said cam adjusting means, and a sensor device responsive to an engine operating condition tending to vary with the engine speed for actuating the other cam adjusting means.

26. In a fuel control system for controlling the flow of fuel to an air-consuming engine within a limited range of fuel-air mixture ratio variation, the combination with regulating means variably adjustable to increase or decrease said mixture ratio, of an engine speed responsive device, an operative connection for adjusting said regulating means from said speed responsive device as a function of engine speed, and additional means for varying the adjustment of said regulating means including a three-dimensional cam, a cam follower positioned by said cam for modifying the operative adjustment of said regulating means as a function of the effective cam lift, said cam being axially and angularly movable relatively to the cam follower, engine operating condition responsive means for varying the axial position of the cam relative to the cam follower, and additional engine operating condition responsive means for altering the angular setting of said cam relative to the cam follower.

27. In a fuel control system for metering the flow of fuel to an air-consuming combustion engine, the combination with regulating means variably adjustable to increase or decrease the fuel-air ratio of the engine combustible mixture within a limited range, of an engine speed responsive device, first means for operatively connecting said speed responsive device with said regulating means for varying the adjustment thereof with changes in engine speed, and additional means including an axially and angularly movable three-dimensional cam, a cam follower for modifying the operating adjustment of said regulating means, first cam positioning means for axially adjusting said cam, second cam positioning means for angularly adjusting said cam, a first sensor device responsive to a temperature affecting engine operation for actuating one of said cam positioning means, and a second device for actuating the other cam positioning means as a function of another parameter of engine operation.

References Cited in the file of this patent

UNITED STATES PATENTS

| 2,193,927 | Jivkovitch | Mar. 19, 1940 |
| 2,281,411 | Campbell | Apr. 28, 1942 |

OTHER REFERENCES

Ser. No. 281,826, Stieglitz (A. P. C.), published May 18, 1943.